United States Patent
Kludy

(10) Patent No.: US 10,805,283 B2
(45) Date of Patent: Oct. 13, 2020

(54) SINGLE SIGN-ON FROM DESKTOP TO NETWORK

(71) Applicant: Citrix Systems, Inc., Fort Lauderdale, FL (US)

(72) Inventor: Tom Kludy, Fort Lauderdale, FL (US)

(73) Assignee: Citrix Systems, Inc., Fort Lauderdale, FL (US)

(*) Notice: Subject to any disclaimer, the term of this patent is extended or adjusted under 35 U.S.C. 154(b) by 298 days.

(21) Appl. No.: 16/010,580

(22) Filed: Jun. 18, 2018

(65) Prior Publication Data

US 2019/0386980 A1 Dec. 19, 2019

(51) Int. Cl.
*H04L 29/06* (2006.01)
*H04L 9/30* (2006.01)

(52) U.S. Cl.
CPC ............ *H04L 63/0815* (2013.01); *H04L 9/30* (2013.01); *H04L 63/0838* (2013.01)

(58) Field of Classification Search
CPC .... H04L 63/0815; H04L 63/0838; H04L 9/30
See application file for complete search history.

(56) References Cited

U.S. PATENT DOCUMENTS

| | | | | |
|---|---|---|---|---|
| 8,255,984 B1* | 8/2012 | Ghostine | ................. | G06F 21/41 709/217 |
| 8,505,083 B2* | 8/2013 | Kuzin | .................... | G06F 21/41 713/182 |
| 9,282,097 B2* | 3/2016 | Agarwal | ................. | G06F 21/41 |
| 9,491,161 B2* | 11/2016 | Suresh | ................ | H04L 63/0281 |
| 9,544,295 B2* | 1/2017 | Fang | ..................... | H04L 63/083 |
| 9,699,168 B2* | 7/2017 | Pieczul | ............... | H04L 63/0815 |
| 10,382,426 B2* | 8/2019 | Falodiya | ............. | H04L 63/0838 |
| 2010/0146611 A1* | 6/2010 | Kuzin | ..................... | G06F 21/41 726/8 |
| 2012/0084570 A1* | 4/2012 | Kuzin | ..................... | G06F 21/41 713/182 |
| 2013/0067229 A1* | 3/2013 | German | ............. | H04L 63/0815 713/171 |
| 2013/0227668 A1* | 8/2013 | Mocanu | ............. | H04L 63/0815 726/8 |

* cited by examiner

*Primary Examiner* — Vance M Little
(74) *Attorney, Agent, or Firm* — Banner & Witcoff, Ltd.

(57) ABSTRACT

Methods, systems, computer-readable media, and apparatuses method for performing single sign on for a user device to the Internet. User sign-in credentials including an identity token of the user are received by a hosted desktop from the user device, including an indication that the user is attempting to access a website. The website is authorized as a trusted website by a network authorization node, and the website is issued a one-time-use token. A web browser of the hosted desktop receives an application provided by the website to cause the web browser to call the hosted desktop to initiate single sign on. Authenticity of the one-time-use token is requested by a daemon process, and the website's public key is obtained. Upon verifying authenticity of the web site, the identity token of the user is passed to the website, to enable the website to establish single sign on with the user.

20 Claims, 7 Drawing Sheets

SINGLE SIGN-ON FROM DESKTOP TO NETWORK

FIELD

Aspects of the disclosure relate to computer hardware and software. In particular, one or more aspects of the disclosure generally relate to computer hardware and software for enabling single sign-on from a computer to a network, such as from a desktop computer to the Internet.

BACKGROUND

Single sign-on (SSO) is a feature that enables access control of a plurality of related, yet independent, software systems. With the single sign-on feature, a user logs in with a single username (ID) and password to gain access to a connected system or systems without having to log in using different usernames or passwords. This can be accomplished, for example, using the Lightweight Directory Access Protocol (LDAP) and stored LDAP databases on one or more directory servers accessible via the Internet.

In essence, a single authentication provides access to multiple applications by passing the authentication token seamlessly to configured applications as Single Sign-On. In a similar manner, single sign-off is the property whereby a single action of signing out terminates access to a plurality of different software systems Benefits of using SSO include: 1) Mitigating risk for access to third party sites in which user passwords are not stored or managed externally, 2) reducing password fatigue from a user having to remember and use different user name and password combinations to access different software systems, 3) reducing time spent re-entering usernames and passwords for the same identity, and 4) reducing IT costs due to lower number of IT help desk calls regarding having to reset usernames and/or passwords In some conventional implementations, SSO utilizes centralized authentication servers that applications and systems use for authentication purposes, together with techniques to ensure that users do not have to actively enter their authentication credentials more than once.

Types of SSO implementations include: 1) Kerberos-based SSO, 2) Smart-card based SSO, 3) Integrated Windows Authentication, and 4) Security Assertion Markup Language (SAML).

For Kerberos-based SSO, a user performs an initial sign on to access a software application, which prompts the user to enter his/her credentials, which in turn provides the user with a Kerberos ticket-granting ticket (TGT). Additional software applications requiring authentication use the TGT to obtain service tickets, so as to authenticate the user's identity to other devices such as mail servers or data storage servers without the user having to re-enter his/her credentials.

For Smart-card based SSO, a user performs an initial sign on to access a software application, which prompts the user for a smart card. Additional software applications requiring authentication use the smart card, without prompting the user to re-enter his/her credentials.

For Integrated Windows Authentication, specific protocols are utilized to enable automatic authenticated connections between an Internet browser, such as Internet Explorer, and a software application.

For SAML based SSO, an extensible markup language (XML) solution is provided for exchanging user authentication information between an SAML identity provider and a SAML service provider. A user using a browser requests an Internet resource that is protected by a SAML service provider, whereby the SAML service provider attempts to authenticate the user by issuing an authentication request to a SAML identity provider through the browser. The SAML identity provider is the entity that provides the user credentials to user's authentication credentials to the SAML service provider, whereby the SAML service provider provides the user access to its services and/or resources based on the user's authentication credentials.

For conventional SSO solutions such as those described above, SSO will only work if the initial sign-on happens from the same browser within the same computer (e.g., the same user desktop), or if the website that is requested to be accessed via a browser and the user's computer are both in the same Active Directory (AD) domain and the website uses Integrated Windows Authentication SSO. For a Cloud-hosted website, the situation of a website that is requested to be accessed by a user's browser and the user's computer being in the same AD domain cannot happen, and for a browser in a hosted session, the user's browser is not within the same computer. For example, a hosted session from a hosted desktop using Citrix XenApp or Microsoft Remote Desktop Services provides for a user's desktop to be hosted, run, delivered and supported from a central location, such as a secure data center. As such, the hosted session is provided from a device, such as a server, at a central location for which a browser within that server is used to access one or more websites requested by a user at a user computer separate from the server. As such, conventional SSO implementations may not work well for those situations.

When signing onto a hosted desktop, such as by using Citrix XenApp to establish a desktop virtualization system, the user's identity token is transferred into the hosted desktop and placed into a secure native store. A hosted desktop may involve a browser-based connection to a desktop environment that includes a plurality of desktop applications, such as Microsoft Office applications. The desktop is hosted, run, delivered and supported from a central location, such as a secure data center remote from the user's desktop, to enable the user to access various services remotely from his/her desktop. The secure native store may be a memory provided at the same central location as the hosted desktop, or at some other site separate from the user's desktop. This configuration allows authorized native applications in the hosted desktop to obtain access to the token, and use the token in order to access resources, such as access to a particular website or software application, without requiring an additional sign-on by the user.

However, if the user opens a browser within the hosted desktop, that browser, being a third party component separate from the user's computer, does not know how to obtain access to the token from the secure native store, and thus the browser cannot pass the token to a website for which the user is attempting to access via the browser, and thus a single sign-on procedure cannot take place. As such, the website cannot do single sign-on, whereby the website then has to prompt the user for his/her credentials, leading to a poor user experience having to enter his/her credentials more than once.

There is a need to provide for a SSO solution for cases in which a browser attempting to access a resource such a website is provided in a hosted computer that is not the user's computer, or when the user attempts to access a cloud-hosted website from his/her computer.

SUMMARY

Aspects of the disclosure relate to various systems and techniques that provide for a method for performing Single Sign On (SSO) for a user.

The method includes receiving, by a hosted desktop accessible, user sign-in credentials including an identity token of the user via a network connection from a user device. The method further includes monitoring for activity on one or more ports on a local host interface. The method still further includes receiving, by the hosted desktop, an indication that a web browser on the hosted desktop is being operated by the user to access a website. The method also includes receiving, by the web browser on the hosted desktop, a one-time-use token and computer code executable by the hosted desktop, wherein the computer code causes the web browser to make a call to the local host interface to initiate a single sign on from the hosted desktop into the website. The method includes detecting, via the monitoring of the one or more ports of the local host interface, the call. The method also includes, in response to the detecting of the call on the one or more ports of the local host interface, determining authenticity of the one-time-use token with a network authentication node, and retrieving a public key of the website from the network authentication node when the one-time-use token is determined to be authentic. The method further includes providing, to the web browser, the identity token of the user in response to determining that the one-time-use token is authentic. The method also includes sending, by the web browser to the website, the identity token of the user to establish a single-sign on by the user with the website.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings identified above, which form a part hereof, and in which is shown by way of illustration various embodiments in which various aspects of the disclosure may be practiced. Other embodiments may be used, and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As noted above, certain embodiments are discussed herein that relate to providing single sign on (SSO) for a user attempting to access a trusted website site via a hosted desktop, in which a one-time-use token is used to ensure security of the user's identity token to be sent to the trusted website to initiate the SSO. Before discussing these concepts in greater detail, however, several examples of computing architecture and enterprise mobility management architecture that may be used in implementing and/or otherwise providing various aspects of the disclosure will first be discussed with respect to FIGS. 1-4.

Figure 1:
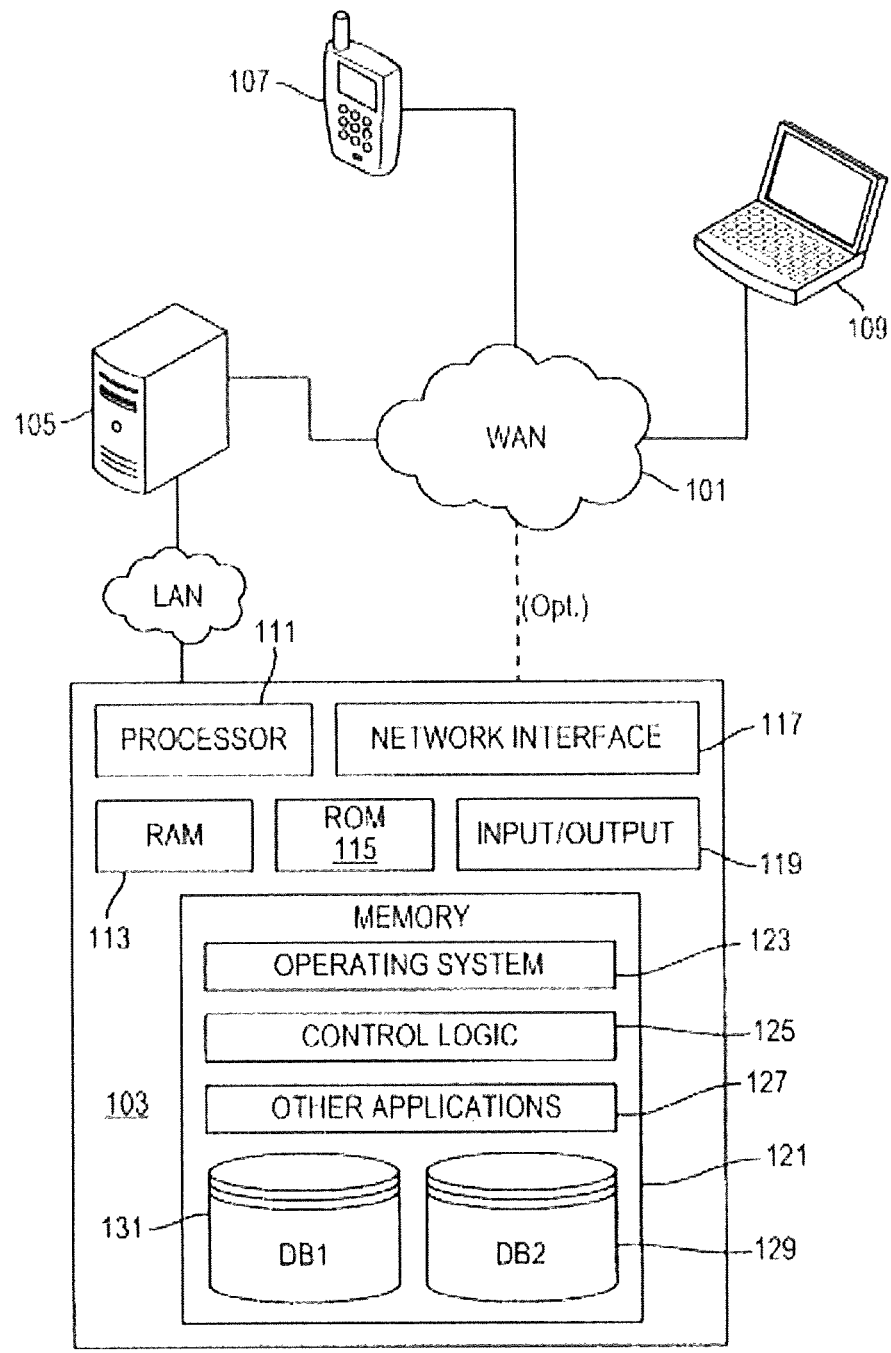
FIG. 1 depicts an illustrative computer system architecture that may be used in accordance with one or more illustrative aspects described herein.

Computer software, hardware, and networks may be used in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LANs), metropolitan area networks (MANs), wireless networks, personal networks (PANs), and the like. Network 101 is for illustration purposes and may be replaced with fewer or additional computer networks. A LAN may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Javascript or ActionScript. The computer executable instructions may be stored on a computer readable medium such as a nonvolatile storage device. Any suitable computer readable storage media may be used, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
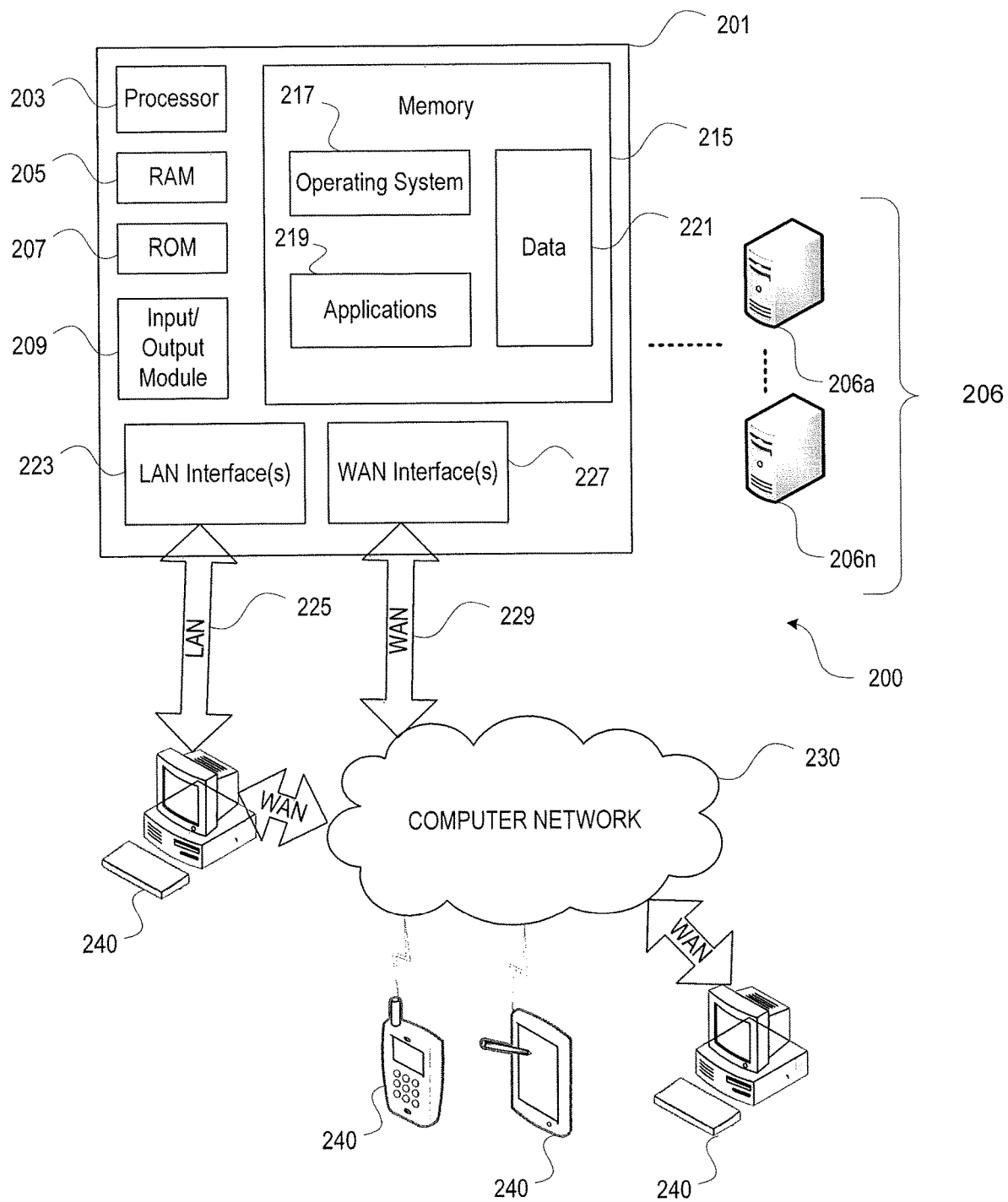
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) and can be configured to provide virtual machines for client access devices. The generic computing device 201 may have a processor 203 for controlling overall operation of the device 201 and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine client agent program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments, the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.). In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system (OS) in which local and/or remote applications can be integrated. Applications may include programs that execute after an instance of an OS (and, optionally, also the desktop) has been loaded. Each instance of the OS may be physical (e.g., one OS per device) or virtual (e.g., many instances of an OS running on a single device). Each application may be executed on a local device, or executed on a remotely located device (e.g., remoted).

Figure 3:
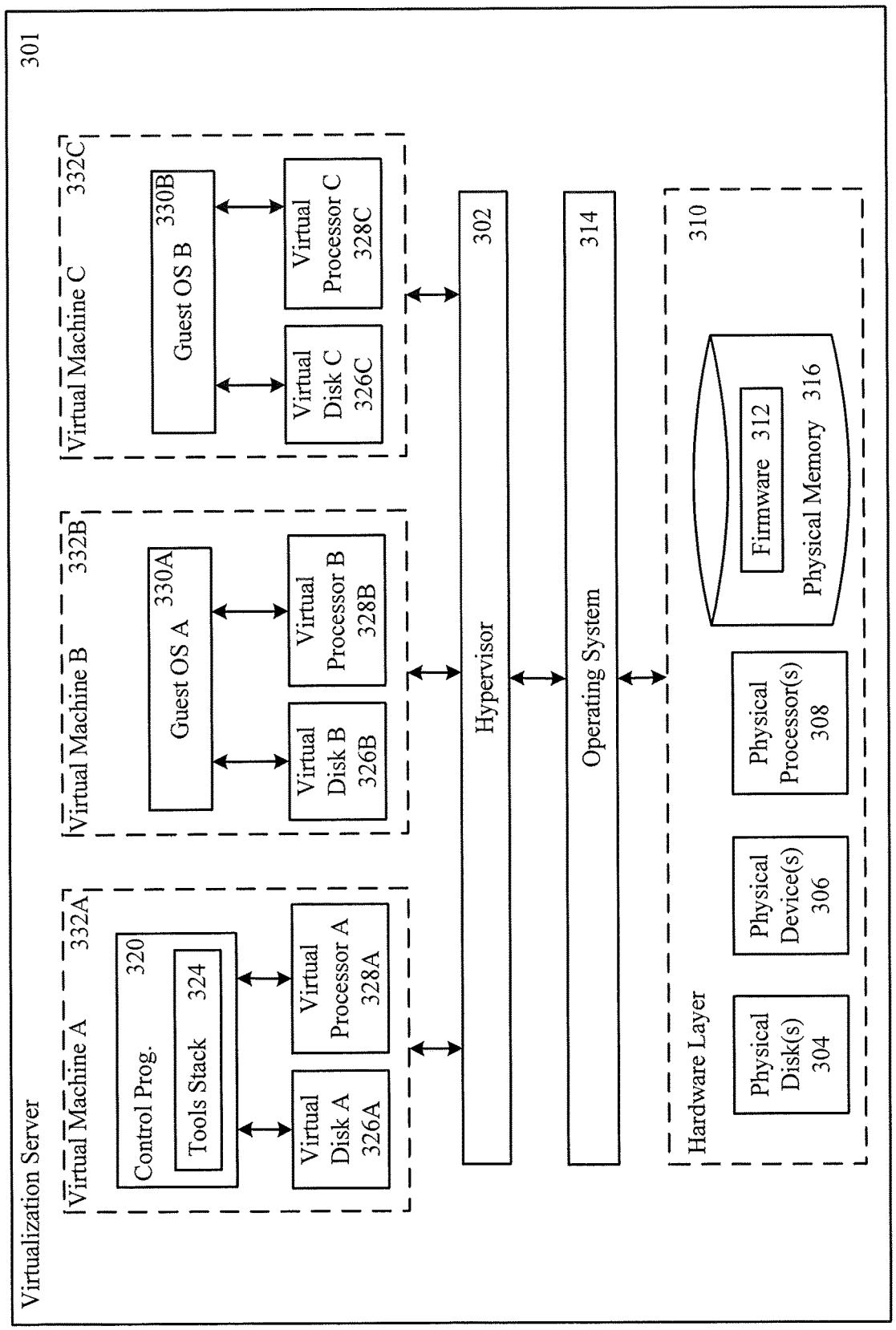
FIG. 3 depicts an illustrative virtualization (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor 302. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (Not Shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
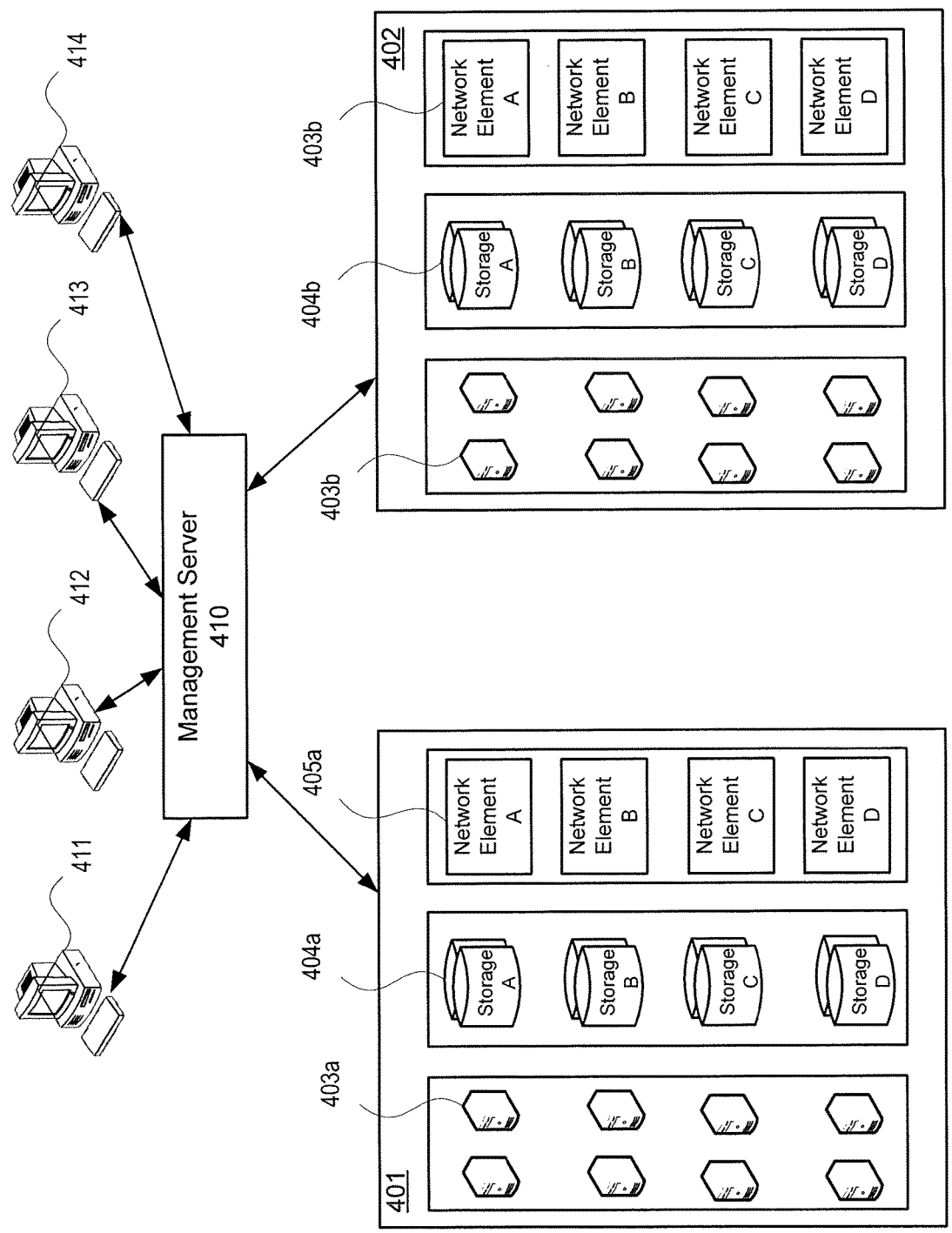
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system). As seen in FIG. 4, client computers 411-414 may communicate with a cloud management server 410 to access the computing resources (e.g., host servers 403, storage resources 404, and network elements 405) of the cloud system.

Management server 410 may be implemented on one or more physical servers. The management server 410 may run, for example, CLOUDSTACK or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of Application Programing Interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related to, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (by Microsoft Corporation), AMAZON EC2 (by Amazon.com Inc. of Seattle, Wash.), IBM BLUE CLOUD (by IBM Corporation of Armonk, N.Y.), or others.

Having discussed several examples of the computing architecture and the enterprise mobility management architecture that may be used in providing and/or implementing various aspects of the disclosure, a number of embodiments will now be discussed in greater detail. In particular, and as introduced above, some aspects of the disclosure generally relate to providing a SSO solution for a user device, such as a user's desktop containing an identity token, with a website that may authenticate the user with the same identity token.

According to at least one aspect, one or more ports on a hosted desktop may be monitored or listened by a daemon process running on the hosted desktop, to enable transfer of a one-time-use token via a call, such as via an Asynchronous JavaScript and XML (AJAX) call made by a browser on the hosted desktop to one of the one of more ports, to enable the daemon process to detect the call and then access a SSO coordinator with the one-time-use token to verify that the one-time-use token is authentic and not already used. Upon verification of the token by the SSO coordinator that the one-time-use token is authentic and not already used, the daemon process may then obtain the user's identity token from a secure store accessible by the hosted desktop, encrypt the user's identity token using a public key of the website, and notify the browser to send the encrypted user's identity token to the website, to enable a SSO between the user and the website. The website decrypts the user's identity token using its private key.

According to at least one aspect, a local host interface may be utilized to provide for secure transfer of information, including the user's identity token, between a daemon process on the hosted desktop and a browser on the hosted desktop. This ensures that external devices cannot intercept that information to thereby fraudulently obtain the user's identity token or other personal information.

According to at least one aspect, the user's identity token may be encrypted using a public key of a trusted website, and then sent as encrypted information, from the hosted desktop to the trusted website via a network such as a WAN or the Internet, to ensure that this information cannot be decrypted by unscrupulous third parties having access to the network, since those third parties do not have access to the trusted website's private key that is required to decrypt the information (that includes the user's identity token) sent from the hosted desktop to the trusted website to establish SSO.

Figure 5:
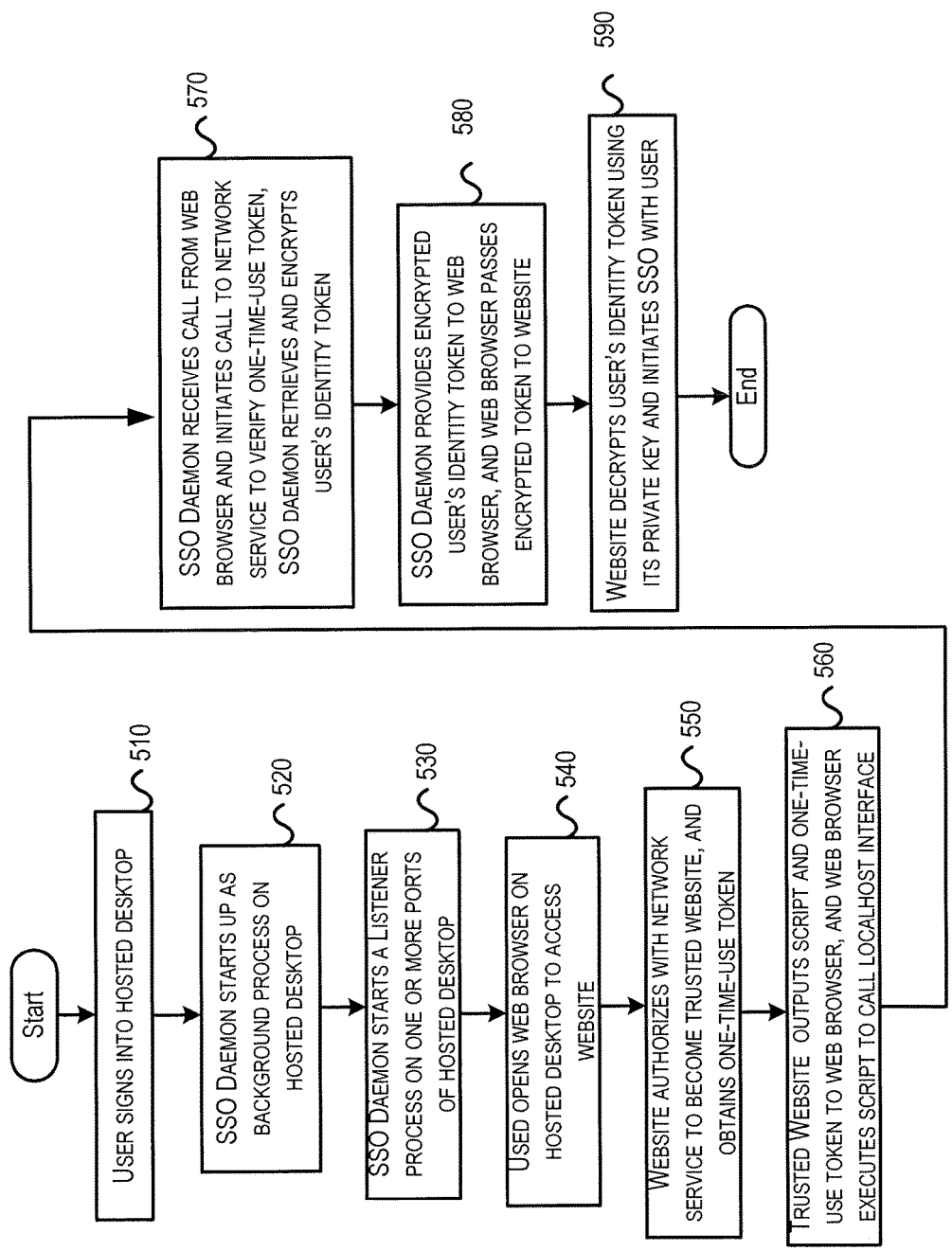
FIG. 5 depicts a flow diagram that illustrates a method to achieve SSO for a user accessing a website via a host desktop web browser, in accordance with one or more illustrative aspects described herein.
Figure 6:
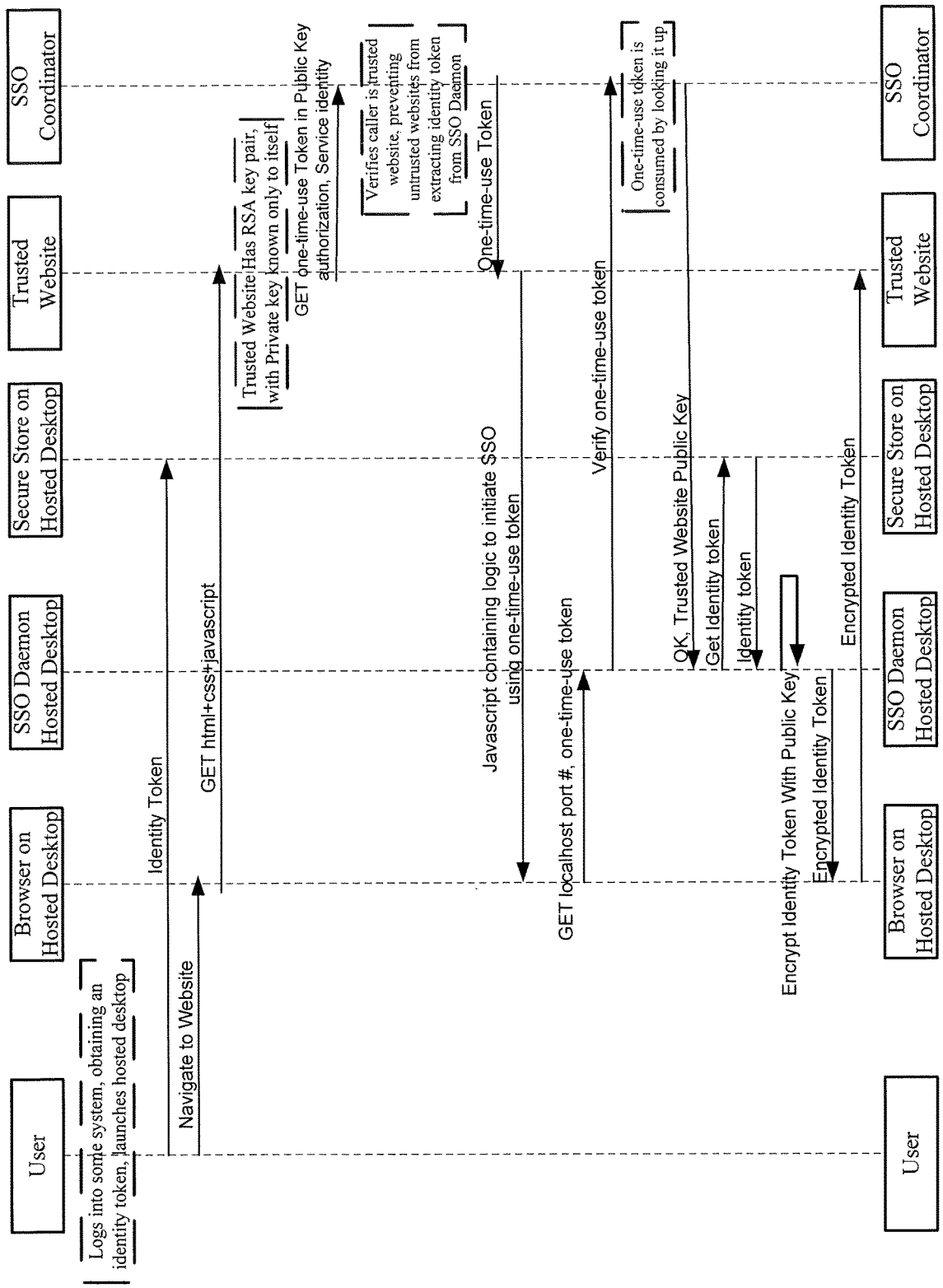
FIG. 6 depicts a timing chart showing signals sent amongst a plurality of network components to achieve SSO for a user accessing a website via a host desktop web browser, in accordance with one or more illustrative aspects described herein.
Figure 7:
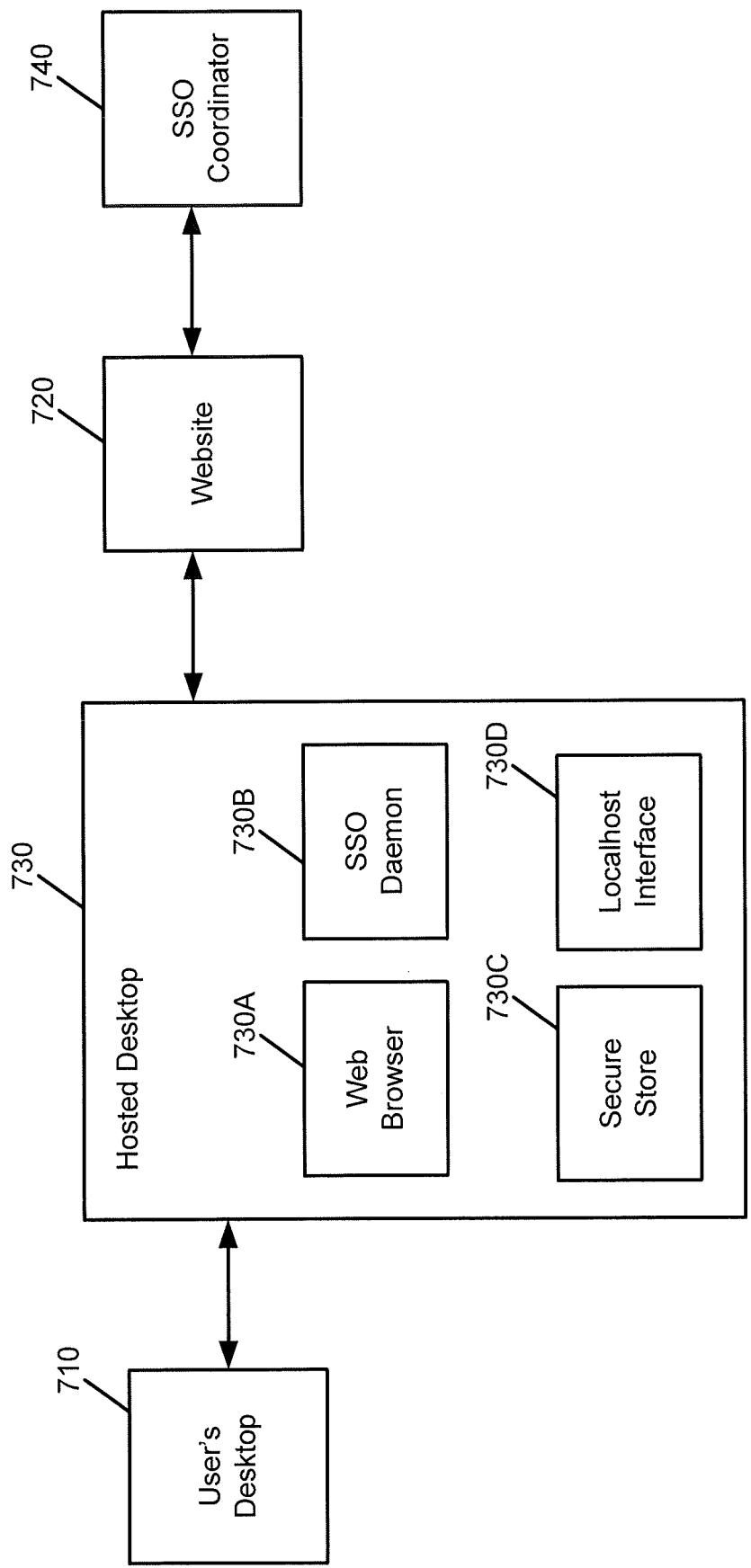
FIG. 7 depicts in block diagram form network components used to achieve SSO for a user accessing a website via a host desktop web browser, in accordance with one or more illustrative aspects described herein.

FIG. 5 is a flow diagram showing steps involved in providing a SSO solution according to one or more aspects. FIG. 6 is a diagram showing the types of information passed amongst various elements in a computer network to achieve a SSO solution according to one or more aspects. FIG. 7 shows in block diagram form the elements in a computer network for providing a SSO solution according to one or more aspects.

Turning now to FIG. 5, in step 510, a user signs into a hosted desktop, such as a desktop computer provided at a secure data center. The signing on by the user from the user's desktop computer to the hosted desktop may be via a virtualization connection, such as via Citrix XenApp or Citrix XenDesktop, for example. In the process of the user properly signing on to the hosted desktop, the user's identity is transferred into the hosted desktop and stored in a secure native store, such as a memory provided at the secure data center of a Cloud-based service. The transfer of the user's identity into the hosted desktop may be performed in a variety of ways known to those skilled in the art, such as by using a secure network connection using a virtualized Cloud-based system such as Citrix XenApp or Citrix Xen- Desktop. The secure store may be a native secure store utilizable by a particular operating system, such as Data Protection API (DPAPI) on Microsoft Windows that enables encryption of sensitive data.

By way of background, the user's identity token may be obtained by the user when the user enters his/her credentials, such as by entering a username and password, and/or by the user inputting a smart card into a smart card receiving slot on the user's computer. The user may then be provided with an identity token upon successful entry of his/her credentials.

In step 520, an Operating System (OS) service (e.g., a WINDOWS service or IOS service) or daemon may be started as a background process within the hosted desktop when a user launches the hosted desktop. The OS service or daemon is referred to herein as a SSO daemon. In particular, the SSO daemon may be a computer program that runs as a background process that is not under direct control of the user. By way of example, the trigger for starting the SSO daemon, in some examples, may be when the user logs onto the hosted desktop. In addition, the SSO daemon can be configured to stop running on the hosted desktop or otherwise go back to sleep in response to the user logging off the hosted desktop.

In step 530, the SSO daemon starts an HyperText Transfer Protocol (HTTP) listener process using an HTTP connection on one or more ports of the hosted desktop, such as one or more Transport Control Protocol (TCP) ports and/or one or more File Transfer Protocol (FTP) ports. By way of example and not by way of limitation, three or four ports typically not in use, e.g., ports 3268, 5883, and 6281, may be monitored by the listener process, as these are ports typically not used by most if not all applications on the hosted desktop. The 'listening' process may be performed, for example, on a loopback (localhost) network interface, for listening for information sent from the browser on the hosted desktop. A localhost is a hostname that signifies "this computer," and may be used to access the network services that are running on a host, such as the hosted desktop, via a loopback network interface, in which packets are looped back to the sending computer, and are not passed to any network interface controller or a hardware device driver. That is, using the loopback network interface bypasses any local network interface hardware. By the use of the loopback network interface, external network devices are not able to access the SSO daemon listener process, thereby providing a secure path for data transfer between sending and receiving components (e.g., between the web browser and the SSO daemon) on the hosted desktop.

In some aspects, the HTTP listener process performed by the SSO daemon may obtain a secure SSO certificate, such as at installation time when the HTTP listener process is installed on the hosted desktop, for example, whereby a secure network connection (e.g., HTTPs connection) may be provided for the listener process.

In step 540, within the hosted desktop, the user opens a web browser and navigates to a desired website, for that website to then perform SSO with respect to the user.

In step 550, the website attempting to be accessed by the user authorizes with a centralized cloud-hosted service, such as Citrix Cloud, in order to establish itself as a trusted site to receive the user's identity token. This may be performed using some form of service level authorization. For example, the website's certificate issued by a trusted certificate authority may be obtained by the centralized cloud-hosted service as provided by the website, and authenticated to ensure that the website is authentic. The centralized cloud-hosted service may be referred to as a SSO coordinator, which, once the website authorized, the website's public key, e.g., a Rivest/Shamir/Adleman (RSA) public key is stored, and the SSO coordinator issues a one-time-use token that authorizes the website to obtain the user's identity token.

In step 560, the website outputs processor-executable script, such as Javascript, to the web browser on the hosted desktop. Upon receipt of the Javascript by the web browser, the web browser executes the Javascript to cause the web browser to make a call, such as an AJAX call, to the localhost interface in order to initiate single sign-on. For example, Internet Protocol (IP) address 127.0.0.1 may correspond to a predetermined IP address used solely for loopback packets sent and received via the localhost interface. An AJAX call is an asynchronous request initiated by the web browser that does not directly result in a page transition. In response to an AJAX call, a website may return only a portion of a requested web page, and not the entire web page. The website also passes along the one-time-use token to the web browser in step 560.

In step 570, the SSO daemon, upon receiving the call from the web browser via listening on the localhost interface, initiates a call to the SSO coordinator, in order to verify the legitimacy of the one-time-use token, since the SSO coordinator was the entity that provided the one-time-use token to the website. In doing so, the SSO daemon retrieves the trusted website's RSA public key from the SSO coordinator. Upon verification of the website, the SSO daemon returns the user's identity token, encrypted with the RSA public key, in response to the AJAX call that it received from the web browser.

In step 580, the SSO daemon provides the encrypted user's identity token to the web browser, and the Javascript executable by the web browser causes the web browser to pass the encrypted identity token to the website that the user desires to access.

In step 590, the website decrypts the user's identity token using its RSA private key of its RSA public key/private key pair, whereby the website then establishes a single sign-on with the user who had signed on into the hosted desktop.

FIG. 6 shows which of the various steps of FIG. 5 are performed amongst a user logging onto a hosted desktop, a browser on the hosted desktop, a SSO daemon on the hosted desktop, a secure store on the hosted desktop, a trusted website that is desired to be accessed by the user, and a SSO coordinator. FIG. 6 also shows the information sent and received amongst the various network elements to enable SSO between a user and a trusted website according to one or more aspects.

As shown in FIG. 6, the user logs into a system, such as Citrix Cloud, obtains an identity token from the user's desktop after having successfully signing into the system with a username and password or by providing some other type of authentication information (e.g., fingerprint, eye scan), or by multifactor authentication. The user then launches a hosted desktop provided at another location, such as a data center in which a plurality of servers host a plurality of hosted desktops. The connection between the user's desktop and the hosted desktop may be via a virtualization connection over the Internet using Citrix XenApp or Citrix XenDesktop, for example.

The identity token of the user is sent from the user's desktop to the hosted desktop over a virtualization connection between the two desktops. The identity token may be stored in a secure store of the hosted desktop, so that unauthorized third parties are not able to access the user's identity token unless authorized to do so by the system. The user's identity token may be provided to the secure store on the hosted desktop in any of a variety of ways that ensures the security of the user's identity, such as via a virtual private network connection, or via an HTTPs secure network connection between the user's desktop and the hosted desktop and between the hosted desktop and the secure store.

The user navigates to a trusted website using a browser of the hosted desktop, and attempts to access the website using a GET command of a JavaScript program sent via an HTTP or HTTPs connection. The GET command may be automatically output by the browser (e.g., Firefox, Internet Explorer, Google Chrome) based on the user navigating to a particular website and attempting to access that website.

The trusted website has a RSA private key/public key pair, which has been provided to it by a certification authority (CA) when the website was authenticated and thereby "trusted" by the CA (this may have been done any time prior to the user attempting to access the website, such as more than one year prior to the time when the user is attempting to access the website). The public key is made available to all users, and the private key is made available only to the website and to no one else.

The website obtains a one-time-use token (a 'pass' or 'ticket') from a SSO coordinator, based on a request for the one-time-use token by the website. The SSO coordinator may be a CA or ticketing service, for example, or other type of network administrative node that performs administrative functions for the network. In any case, the SSO coordinator has access to network authentication information of the various elements of the network. The SSO coordinator verifies that the website is "trusted" and that the website has a valid certificate (i.e., non-expired certificate), and upon verification the SSO coordinator provides a one-time-use token to the website. This way, untrusted websites are not provided with a one-time-use token by the SSO coordinator, and thus untrusted websites cannot obtain the user's identity token.

Upon receiving the one-time-use token from the SSO coordinator, the trusted website sends Javascript to the browser on the hosted desktop, whereby the Javascript contains logic to cause the browser to initiate a SSO with the website using the one-time-use token. The Javascript is executable by the browser to perform specific tasks determined by computer code making up the Javascript.

Upon executing the Javascript, the browser 'wakes up' the SSO daemon on the hosted desktop from its normal "sleep" state. Once awaken, the SSO daemon attempts to verify the one-time-use token with the SSO coordinator. By doing so, the one-time-use token is consumed (that is, used up) by the act of the SSO daemon accessing the SSO coordinator to verify the one-time-use token. With the one-time-use token being used up, it cannot be used again by that application or by any other application on the hosted desktop.

Upon verification of the one-time-use token by the SSO coordinator, the SSO coordinator informs the SSO daemon that the one-time-use token has been verified, and provides the trusted website's public key to the SSO daemon.

Upon verification that the website is a trusted website and that the one-time-use token has been verified by the SSO coordinator, the SSO daemon then accesses the secure store to obtain the user's identity token. This access may be performed via the localhost interface or via some other means of inter-element communications amongst the elements making up the hosted desktop.

The SSO daemon, upon receiving the user's identity token, encrypts the user's identity token using the website's public key, and then sends the encrypted identity token to the browser. Transmission of the encrypted identity token may be performed via the localhost interface or via some other means of inter-element communications amongst the elements making up the hosted desktop.

The browser, upon receiving the encrypted identity token from the SSO daemon, sends the encrypted identity token via a network connection, such as an HTTP or HTTPS network connection, to the trusted website, in order to access the website.

The trusted website decrypts the user's identity token using the trusted website's private key, and then uses the decrypted user's identity token to establish a SSO session with the user.

FIG. 7 shows in block diagram form the various elements used to create a SSO between a user's desktop 710 and a website 720, according to one or more aspects. The user's desktop 710 establishes a virtualization session with a hosted desktop 730, whereby the hosted desktop 730 may be provided within a cloud environment, such as Citrix Cloud. The hosted desktop 730 includes a web browser 730A, a SSO daemon 730B, and a secure store 730C, the operations of which have been described above with respect to FIG. 5 and FIG. 6. In addition, the hosted desktop 730 may include a localhost interface 730D. The localhost interface 730D may be used for communications between various elements of the hosted desktop 730, such as communications between the web browser 730A and the SSO daemon 730B. In addition, the hosted desktop 730 accesses the website 720 in response to a user command sent from the user's desktop 710 to the hosted desktop 730, which causes the web browser 730A to navigate to the website 720. The SSO coordinator/website authenticator 740 performs authentication of the website 720, as a trusted website, as described above.

By way of performing SSO for a user according to one or more aspects as described above, non-trusted websites are not able to extract a user's identity token because they cannot obtain the one-time-use token (or ticket) from the SSO coordinator, since the non-trusted websites are not authenticated by the SSO coordinator.

Similarly, non-trusted processes (i.e., software applications) on the hosted desktop are prevented from obtaining the user's identity token because the SSO daemon will fail any call to it that does not have a valid one-time-use token. For example, if a non-trusted process on the hosted desktop accesses the browser on the hosted desktop in order to attempt to access a trusted website, it cannot do so because the one-time-use token has been used already by the user, and thus cannot be used again by the non-trusted process in its attempt to access the SSO coordinator. In other words, the SSO coordinator does not send the RSA public key to the non-trusted process because the one-time-use token is no longer valid. Without the RSA public key, the non-trusted process on the hosted desktop cannot obtain the identity token from the secure store. As such, the user's identity token stored in the secure store by an action initiated in the past by a trusted process on the user's desktop cannot be accessed by a non-trusted process on the hosted desktop, thereby providing for a secure SSO system and method.

Non-trusted processes may be prevented from man-in-the-middle interception of the user's identity token as a result of the token, when revealed, being encrypted with the website's public key such that only the trusted website can decrypt it with its private key known only to the trusted website. Thus, a man-in-the-middle interception results in the interceptor obtaining an encrypted token that the interceptor cannot decrypt. In such a manner, the non-trusted process cannot instruct the trusted website to start a process by faking a page load, since the non-trusted process does not have access to the decrypted one-time-use token, so that the non-trusted process cannot call the SSO daemon using the one-time-use token to obtain the user's identity token.

By using Citrix Cloud to access a hosted desktop, for example, the role of SSO coordinator may be performed by a Citrix Cloud (CC) ticketing service, and the website that is desired to be accessed by a user who has logged into the hosted desktop would be authorized to obtain a ticket from the CC ticketing service by having obtained a Citrix Cloud service key with appropriate rights.

In other aspects, information may be securely passed from a user from the user's located desktop apart from the user's identity token, to a trusted website, using the steps as shown in FIG. 5 and the passing of information amongst the elements in a computer network as shown in FIG. 6.

As explained above in some detail, the ports listened by the SSO daemon may be ports, such as three or four ports, typically not used by applications on the hosted desktop, whereby those port numbers, such as 3533, 4366, and 6031, for example, are known beforehand to both the SSO daemon and to the trusted website. That way, when the trusted website communicates with the web browser on the hosted desktop, the SSO daemon can detect those communications, and perform a SSO procedure between a user and a trusted website as explained in detail above.

As illustrated above, various aspects of the disclosure relate to computer hardware and software for providing a SSO process for a user accessing a hosted desktop in order to access a web-based service such as a particular website. For example, authentication information provided by using asymmetric cryptology between the hosted desktop and the trusted website may be performed by using information other than an RSA public key/private key pair. By way of example, Diffie-Hellman key exchange, elliptic curve cryptography, X22519 key exchange, or key serialization may be utilized instead of RSA encryption. While the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A method for performing Single Sign On (SSO) for a user, comprising:
   receiving, by a hosted desktop via a network connection with a user device, user sign-in credentials including an identity token of the user;
   monitoring for activity on one or more ports on a local host interface;
   receiving, by the hosted desktop, an indication that a web browser on the hosted desktop is being operated by the user to access a website;
   receiving, by the web browser on the hosted desktop from the website, a one-time-use token and computer code executable by the hosted desktop, wherein the computer code is configured to cause the web browser to make a call to the local host interface to initiate a single sign on from the hosted desktop into the website;
   detecting, via the monitoring of the one or more ports of the local host interface, the call;
   in response to the detecting of the call on the one or more ports of the local host interface, determining authenticity of the one-time-use token with a network authentication node, and retrieving a public key of the website from the network authentication node when the one-time-use token is determined to be authentic;
   providing, to the web browser, the identity token of the user in response to determining that the one-time-use token is authentic; and
   providing, by the web browser to the website, the identity token of the user to establish a single-sign on by the user with the website.

2. The method of claim 1, further comprising, after the receiving the indication by the hosted desktop, and prior to the receiving by the web browser of the one-time-use token:
   receiving, by the website from the network authentication node, an indication that the website is a trusted website, and
   receiving, by the website from the network authentication node, the one-time-use token.

3. The method of claim 1, wherein the providing the identity token of the user further comprises:
   encrypting the identity token of the user with a public key of the website.

4. The method of claim 3, wherein the providing further comprises:
   storing the identity token of the user in a secure store of the hosted desktop in response to the hosted desktop receiving the user sign-in credentials from the user device; and
   obtaining the identity token of the user from the secure store accessible by the hosted desktop.

5. The method of claim 3, further comprising:
   decrypting, by the website, the identity token of the user using a private key of the website.

6. The method of claim 1, wherein the network connection between the user device with the hosted desktop is a virtualization connection using the Internet.

7. The method of claim 1, wherein the computer code executable by the hosted desktop comprises a JavaScript program executable by the web browser.

8. The method of claim 1, wherein the call comprises an asynchronous JavaScript and XML (AJAX) call.

9. The method of claim 1, wherein the monitoring for activity on one or more ports of the hosted desktop comprises monitoring localhost network ports.

10. The method of claim 1, further comprising:
    initiating a monitoring process on the hosted desktop in response to receiving the user sign-in credentials.

11. The method of claim 10, further comprising:
    in response to the providing the identity token of the user, stopping the monitoring process on the hosted desktop.

12. One or more non-transitory computer-readable media storing instructions for performing single sign-on for a user, the instructions, when executed by a system that includes at least one processor and a memory, cause the system to:
    receive, by a hosted desktop via a network connection with a user device, user sign-in credentials including an identity token of the user;
    monitor for activity on one or more ports on a local host interface;
    receive, by the hosted desktop, an indication that a web browser on the hosted desktop is being operated by the user to access a website;
    receive, by the web browser on the hosted desktop from the website, a one-time-use token and computer code executable by the hosted desktop, wherein the computer code is configured to cause the web browser to make a call to the local host interface to initiate a single sign on from the hosted desktop into the website;

detect, via the monitoring of the one or more ports of the local host interface, the call;

in response to the detect of the call on the one or more ports of the local host interface, determine authenticity of the one-time-use token with a network authentication node, and retrieve a public key of the website from the network authentication node when the one-time-use token is determined to be authentic;

provide, to the web browser, the identity token of the user in response to determining that the one-time-use token is authentic; and provide, by the web browser to the website, the identity token of the user to establish a single-sign on by the user with the website.

13. The computer readable media of claim 12, the instructions further cause the system to, after the receive of the indication by the hosted desktop, and prior to the receive by the web browser of the one-time-use token:

receive, by the website from the network authentication node, an indication that the website is a trusted website, and receive, by the website from the network authentication node, the one-time-use token.

14. The computer readable media of claim 13, wherein provide of the identity token of the user further comprises:

store the identity token of the user in a secure store of the hosted desktop in response to the hosted desktop receiving the user sign-in credentials from the user device; and obtain the identity token of the user from the secure store accessible by the hosted desktop.

15. The computer readable media of claim 12, the instructions further cause the system to:

decrypt, by the website, the identity token of the user using a private key of the website.

16. The computer readable media of claim 12, wherein the network connection between the user device with the hosted desktop is a virtualization connection using the Internet.

17. The computer readable media of claim 12, wherein the computer code executable by the hosted desktop comprises a JavaScript program to be executed by the web browser.

18. The computer readable media of claim 12, wherein the call comprises an asynchronous JavaScript and XML (AJAX) call.

19. The computer readable media of claim 12, wherein the monitoring performed to listen for activity on one or more ports of the hosted desktop comprises monitoring localhost network ports.

20. The computer readable media of claim 12, wherein the instructions further cause the system to store the user sign-in credentials in a secure data store.

* * * * *